United States Patent
Pfaendner et al.

(10) Patent No.: US 6,610,765 B1
(45) Date of Patent: Aug. 26, 2003

(54) SYNTHETIC POLYMERS COMPRISING ADDITIVE BLENDS WITH ENHANCED EFFECT

(75) Inventors: Rudolf Pfaendner, Sackgasse (DE); Kurt Hoffmann, Weitenau-Steinen (DE); Felix Meyer, Binningen (CH); Bruno Rotzinger, Birsfelden (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/869,930

(22) PCT Filed: Jan. 4, 2000

(86) PCT No.: PCT/EP00/00010

§ 371 (c)(1),
(2), (4) Date: Jul. 9, 2001

(87) PCT Pub. No.: WO00/42109

PCT Pub. Date: Jul. 20, 2000

(30) Foreign Application Priority Data

Jan. 11, 1999 (EP) ............................. 99810011
Jul. 23, 1999 (CH) ............................. 1356/99

(51) Int. Cl.[7] ............................. C08K 5/34; C08K 3/26; C08K 3/34
(52) U.S. Cl. ............................. 524/108; 524/425; 524/447; 524/449
(58) Field of Search ............................. 524/108, 425, 524/447, 449

(56) References Cited

U.S. PATENT DOCUMENTS

| 4,734,445 A | 3/1988 | Noda et al. ............ 523/201 |
| 5,133,898 A | 7/1992 | Fock et al. ............ 252/356 |
| 5,272,196 A | * 12/1993 | Gardiner ............ 524/583 |
| 5,387,467 A | 2/1995 | Höhner et al. ............ 428/391 |

FOREIGN PATENT DOCUMENTS

EP 0717079 6/1996

OTHER PUBLICATIONS

Derwent Abstr. 94–068617 for JP 06016824, (1994).
R. Gächter et al., Plastics Additives Handbook 3$^{rd}$ Edition, pp. 749–773, (1990).
R. Gächter et al., Plastics Additives Handbook 3$^{rd}$ Edition, pp. 791–809, (1990).
R. Gächter et al., Plastics Additives Handbook 3$^{rd}$ Edition, pp. 863–875, (1990).

* cited by examiner

Primary Examiner—Kriellion A. Sanders
(74) Attorney, Agent, or Firm—Kevin T. Mansfield

(57) ABSTRACT

The dispersion of additives selected from the group consisting of stabilizers, antistatic agents, nucleating agents, biocides and/or flame retardants in synthetic polymers is improved by the addition of at least one polymeric dispersing or solvating agent having amphiphilic properties. Synthetic polymers stabilized in this manner are distinguished by having excellent stability against oxidative, thermal or light-induced degradation.

16 Claims, No Drawings

SYNTHETIC POLYMERS COMPRISING ADDITIVE BLENDS WITH ENHANCED EFFECT

The present invention relates to compositions comprising a synthetic polymer subject to oxidative, thermal or light-induced degradation, in particular a thermoplastic polymer, and as additives at least one additive selected from the stabiliser, antistatic agent, nucleating agent, biocide and/or flame retardant group, and at least one polymeric dispersing or solvating agent having amphiphilic properties, to the use of these additives in synthetic polymers, in particular thermoplastic polymers, as well as to a process for stabilising these synthetic polymers, with the proviso that at least one additive contains a compound from the stabiliser group.

This invention also relates to the use of the polymeric dispersing or solvating agents having amphiphilic properties for the improved dispersion of additives selected from the stabiliser, antistatic agent, nucleating agent and/or biocide group in synthetic polymers, and to a process for the improved dispersion of additives selected from the stabiliser, antistatic agent, nucleating agent and/or biocide group in synthetic polymers.

The effect of synthetic additives depends, for example, on the chemical structure of the additives, on the composition of additive blends, on the dispersion of the additives in the plastic material, on the solubility of the additives in the respective polymer and on the compatibility of the additives with the polymeric matrix. An enhanced compatibility of additives with polymeric substrates, and thus an enhanced effect, can be achieved, for example, through the preparation of preblends. So-called masterbatches or concentrates, which are a preblend of a polymer with additives in high concentrations, are also often used, the subsequent use of this masterbatch making it possible for the additive to be dispersed in the polymer matrix more easily and better than when it is added directly. Although these techniques are very well known, methods are still sought by which the performance of additives may be further improved, i.e. for making full use of them.

Accordingly, this invention has for its object to provide compositions which enhance the effect of existing additives in synthetic polymers, in particular by improved dispersion.

U.S. Pat. No. 5,387,467 discloses the use of organopolysiloxanes with ester groups and long-chain alkyl groups, said groups being bound via carbon atoms to silicium atoms, for modifying the surface of fine particles, such as pigments and fillers, or of glass fibres.

It has now been found that the effect of additives selected from the stabiliser, antistatic agent, nucleating agent, biocide and/or flame retardant group in synthetic polymers is enhanced by the addition of at least one polymeric dispersing or solvating agent having amphiphilic properties. Synthetic polymers thus enhanced are distinguished by having excellent stability against oxidative, thermal or light-induced degradation.

This invention therefore relates to compositions, which comprise a) a synthetic polymer subject to oxidative, thermal or light-induced degradation,
b) at least one additive selected from the stabiliser, antistatic agent, nucleating agent, biocide and/or flame retardant group, and
c) at least one polymeric dispersing or solvating agent having amphiphilic properties.

Examples of antistatic agents are described in R. Gächter and H. Müller, Hanser Verlag, 3$^{rd}$ edition, 1990, pages 749–775. Particularly interesting antistatic agents are those selected from the group consisting of the ethoxylated alkylamines, fatty acid esters, alkyl sulfonates and polymeric systems based on polyamide copolymers, such as Irgastat®P22, of Ciba Spezialitätenchemie.

Examples of biocides are described in R. Gächter and H. Müller, Hanser Verlag, 3$^{rd}$ edition, 1990, pages 791–809. Particularly interesting biocides are those selected from the group consisting of the 10,10'-oxy-bis-phenoxarsines, N-(trihalogenomethlythio)phthalimides, di-phenyl-antimonium-2-ethylhexanoate, copper-bis(8-hydroxyquinoline), tributyltin oxide and the derivatives thereof; halogenated phenols, such as Irgaguard® (Trichlosan CAS number 3380-34-5, Ciba Spezialitätenchemie AG); methylthio-s-triazines, such as 2-methylthio-4-cyclopropylamino-6-(α, β-dimethylpropylamino)-s-triazine, 2-methylthio-4-cyclopropylamino-6-tert-butylamino-s-triazine and 2-methylthio-4-ethylamino-6-(α, β-dimethylpropylamino)-s-triazine.

Preferred compositions are those, wherein component (b) is a stabiliser and/or nucleating agent.

Examples of stabilisers are the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl) pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tertbutyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, didodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl4-hydroxybenzyl)phenol.

1.10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxybenzyl) isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminorhenols, for example 4-hydroxylauranilide, 4-hydroxystearanilide, octyl. N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide 3-thiaundecanol, 3-thiapentadecanol, trimethylhexanediol, trimethylolpropane, 4-hydroxymethyl-1-phospha-2,6,7-trioxabicyclo[2.2.2] octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis-(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.15. Esters of β-(3.5-dicyclohexyl-4-hvdroxyphenyl) prorionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.16. Esters of 3.5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.17. Amides of β-(3,5-di-tert-butyl-4-hydroxyphenyl) propionic acid e.g. N,N'-bis(3,5-di-tertbutyl-4-hydroxyphenylpropionyl)hexamethylenediamide, N,N'-bis(3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl] oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpehtyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecahoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamine, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diaminobut-2-ene, N,N-bis(2,2,6,6-tetramethylpiperid-4yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and light Stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$ where R=3'-tert-butyl-4'-hydroxy-5'-2H-benzotriazol-2-ylphenyl, 2-[2?-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional iigands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(22,26,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentarhethyl-4-piperidyl) n-butyl-3,5-di-tert-butyl-4-hydroxybenzylmalonate, the condensate of 1-(2-hydroxyethyl)-2,2,6,6-tetramethyl-4hydroxypiperidine and succinic acid, linear or cyclic condensates of N,N'-bis(2,2,6,6-tetramethyl-4-piperidyl) hexamethylenediamine and 4-tert-octylamino-2,6dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzoyl)malonate, 3-n-octyl-7,7,9,9-tetramethyl-1,3,8-trizaaspiro[4.5]decan-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chlor-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2 ,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg.

No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro [4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz-[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2"-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosyneraists, for example, dilauryl thiodipropionate or distearyl thiodipropionate.

8. Peroxide scavengers, for example esters of β-thiodipropionic acid, for example the lauryl, stearyl, myristyl or tridecyl esters, rercaptobenziridazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zink pyrocatecholate.

Compounds from the hydrotalcite series can be described by the general formula III

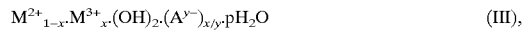

$$M^{2+}{}_{1-x}.M^{3+}{}_{x}.(OH)_{2}.(A^{y-})_{x/y}.pH_{2}O \qquad (III),$$

wherein $M^{2+}$ =Mg, Ca, Sr, Zn, Sn and/or Ni, $M^{3+}$=Al, B or Bi, $A^{y-}$ is an anion having the valency y, y is a number from 1–4, x is a number from 0–0.5, and p is a number from 0–20;

further examples are to be found in DE-A-4106403.

$A^{y-}$ is preferably $OH^-$, $Cl^-$, $Br^-$, $I^-$, $ClO_4^-$, $HCO_3^-$, $CH_3COO^-$, $C_6H_5COO^-$, $CO_3^{2-}$, $SO_4^{2-}$, $(^-OOC-COO^-)$, $(CHOHCOO)_2^{2-}$, $(CHOH)_4CH_2OHCOO^-$. $C_2H_4(COO)_2^{2-}$, $(CH_2COO)_2^{2-}$, $CH_3CHOHCOO^-$, $SiO_3^{2-}$, $SiO_4^{4-}$, $Fe(CN)_6^{3-}$, $Fe(CN)_6^{4-}$ or $HPO_4^{2-}$.

Other hydrotalcites which may conveniently be used are compounds of the general formula IIIa $$M^{2+}{}_x \cdot Al_2 \cdot (OH)_{2x+6yz} \cdot (A^{y-})_2 \cdot pH_2O \quad \text{(IIIa)},$$

in which formula IIIa $M^{2+}$ is at least one metal from the Mg and Zn series, Mg being preferred, and $A^{y-}$ is an anion, for example from the $CO_3^{2-}$, $(^-OOC-COO^-)$, $OH^-$ and $S^{2-}$ series, y is the valency of the anion, p is a positive number, preferably from 0.5 to 15, and x and z are positive numbers, x preferably being 2 to 6 and z being smaller than 2.

Preferred compounds from the hydrotalcite series are those of the general formula III $$M^{2+}{}_{1-x} \cdot M^{3+}{}_x \cdot (OH)_2 \cdot (A^{y-})_{x/y} \cdot pH_2O \quad \text{(III)},$$

wherein $M^{2+}$ is Mg or a solid solution of Mg and Zn, $A^{y-}$ is $CO_3^{2-}$, x is a number from 0 to 0.5, and p is a number from 0 to 20.

Particularly preferred hydrotalcites are those of formulae $Al_2P_3 \cdot 6MgO \cdot CO_2 \cdot 12H_2O$, $Mg_{4.5}Al_2(OH)_{13} \cdot 3,5H_2O$, $4MgO \cdot Al_2O_3 \cdot CO_2 \cdot 9H_2O$, $4MgO \cdot Al_2O_3 \cdot CO_2 \cdot 6H_2O$, $ZnO \cdot 3MgO \cdot Al_2O_3 \cdot CO_2 \cdot 8-9H_2O$ or $ZnO \cdot 3MgO \cdot Al_2O_3 \cdot CO_2 \cdot 5-6H_2O$.

The hydrotalcites can be used in an amount from e.g. 0.1 to 20, usefully from 0.5 to 10 and, preferably, from 0.5 to 5 parts by weight, based on 100 parts by weight of the synthetic polymer.

Preferred zeolites are known from "Atlas of Zeolite Structure Types", W. M. Meier and D. H. Olson, Verlag Butterworths, $2^{nd}$ edition 1986.

In a broader sense, the zeolites also include aluminium phosphates having a zeolite structure.

The preferred zeolites which are known per se have a pore diameter of average effectiveness of 3–5 Å and can be prepared by known methods. Particularly preferred zeolites are those of the NaA type which have a pore diameter of average effectiveness of 4 Å, which is why they are also called zeolites 4A.

Particularly preferred are crystalline sodium alumosilicates, the particle size of which is at least predominantly in the range from 1–10 μ. Particularly preferred zeolites are:

$Na_{12}Al_{12}Si_{12}O_{48} \cdot 27 H_2O$ [zeolite A], $Na_6Al_6Si_6O_{24} \cdot 2 NaX \cdot 7,5 H_2O$, X=OH, halogen, $ClO_4$ [sodalite]

$Na_6Al_6Si_{30}O_{72} \cdot 24 H_2O$, $Na_8Al_8Si_{40}O_{96} \cdot 24 H_2O$, $Na_{16}Al_{16}Si_{24}O_{80} \cdot 16 H_2O$, $Na_{16}Al_{16}Si_{32}O_{96} \cdot 16 H_2O$, $Na_{56}Al_{56}Si_{136}O_{384} \cdot 250 H_2O$, [zeolite Y]

$Na_{86}Al_{86}Si_{106}O_{384} \cdot 264 H_2O$ [zeolite X], or those zeolites which can be prepared by partial or complete exchange of the sodium atoms with Li, K, Mg, Ca, Sr or Zn atoms, such as $(Na,K)_{10}Al_{10}Si_{22}O_{64} \cdot 20 H_2O$.

$Ca_{4.5}Na_3[(AlO_2)_{12}(SiO_2)_{12}] \cdot 30 H_2O$ $K_9Na_3[(AlO_2)_{12}(SiO_2)_{12}] \cdot 27 H_2O$.

The zeolites can be used in an amount from e.g. 0.1 to 20, conveniently from 0.5 to 10 and, preferably, from 0.5 to 5 parts by weight, based on 100 parts by weight of the synthetic polymer.

11. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butylbenzofuran-2-one, 3 3-(2,3-dimethylphenyl)-5,7-di-tert-butyl-benzofuran-2-one.

Interesting compositions are those, wherein component (b) is a stabiliser selected from the group consisting of phenolic antioxidants, aminic antioxidants, UV absorbers, light stabilisers, metal deactivators, phosphites, phosphonites, hydroxylamines, nitrones, thiosynergists, peroxide-scavenging compounds, compounds of the benzofuran-2-one type and/or PVC heat stabilisers, such as Me(II)-carboxylates, Me(II) signifying Ba, Ca, Mg or Zn, preferably mixtures of Ba/Zn- or Ca/Zn-carboxylates.

Examples of nucleating agents are described in R. Gächter and H. Müller, Hanser Verlag, $3^{rd}$ edition, 1990, pages 863–875. Particularly interesting are benzenesulfonamides, bis(p-ethylbenzylidene)sorbitol, sodium benzoate, sodium bicarbonate, sodium-2-2'-methylenebis(4,6-di-tert-butylphenyl)phosphate, or compounds of formula I

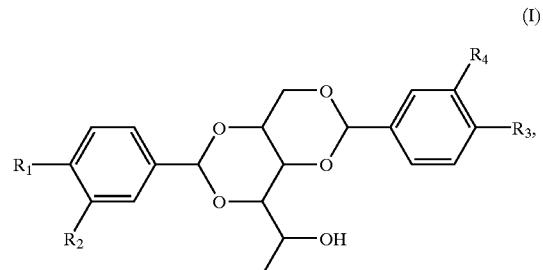

wherein $R_1$, $R_2$, $R_3$ and $R_4$ are each independently of one another hydrogen or $C_1-C_4$alkyl.

Alkyl containing 1 to 4 carbon atoms is a branched or unbranched radical, for example methyl, ethyl, n-propyl, isopropyl, n-butyl, isobutyl or tert-butyl. One of the preferred meanings of $R_1$, $R_2$, $R_3$ and $R_4$ is methyl.

Particularly preferred compositions are those, wherein the nucleating agent is a compound of formula Ia (Irgaclear®DM), Ib (Irgaclear®D) or Ic (Millad®3988).

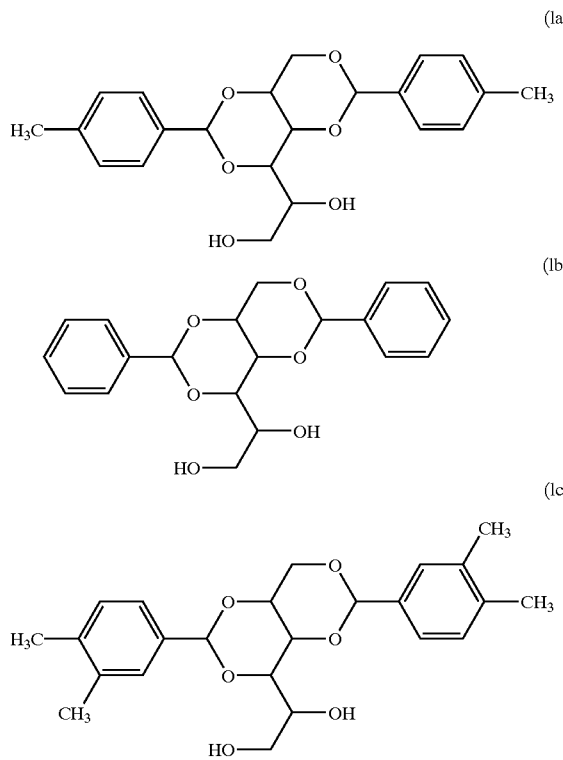

Irgaclear®DM and Irgaclear®D are registered trademarks of Ciba Spezialitätenchemie AG. Millad®3988 is a registered trademark of Miliken.

Of particular interest are those compositions, wherein the nucleating agent is a mixture of Irgaclear®DM and sodium benzoate.

Examples of flame retardants are described in R. Gächter and H. Müller, Hanser Verlag, $3^{rd}$ edition, 1990, pages 709–747. Particularly interesting flame retardants are those selected from the group consisting of tetraphenyl-resorcinol-diphosphite (Fyrolflex® RDP, Akzo Nobel), chloroalkylphosphate ester (Antiblaze®AB-100, Albright & Wilson; Fyrol® FR-2, Akzo Nobel), polybrominated diphenyl oxide (DE-60F, Great Lakes Corp.), decabromodiphenyl oxide. (DBDPO; Saytex® 102E), antimonium trioxide ($Sb_2O_3$), antimonium peentoxide ($Sb_2O_5$), tris[3-bromo-2,2-(bromomethyl)propyl]phosphate (PB 370®, FMC Corp.), triphenyl phosphate, bis(2,3-dibromopropyl ether) of bisphenol A (PE68), ammonium polyphosphate (APP) or (Hostaflam® AP750), oligomeric resorcinol-diphosphate (RDP), brominated epoxy resin, ethylenebis(tetrabromophthalimide) (BT93), bis(hexachlorocyclopentadiene)cyclooctane (Declorane plus®), calcium sulfate, chlorinated paraffin, magnesium carbonate, melamine phosphate, melamine pyrophosphate, molybdenum trioxide, zinc oxide, 1,2-bis(tribromophenoxy)ethane (FF680), tetrabromobisphenol A (Saytex® RB100), magnesium hydroxide, aluminium trihydrate, zinc borate, ethylenediamine diphosphate (EDAP), and compounds of formula F1

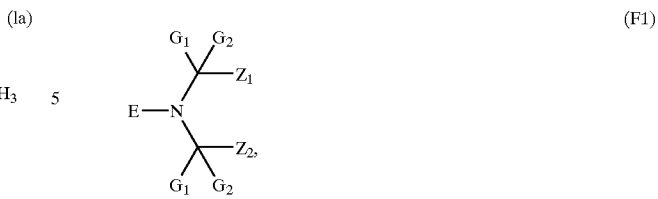

wherein $G_1$ and $G_2$ are each independently of the other $C_1$–$C_4$alkyl or together are pentamethylene, E is $C_1$–$C_{18}$alkoxy, $C_5$–$C_{12}$cycloalkoxy, $C_7$–$C_{25}$aralkoxy or $C_6$–$C_{12}$aryloxy, and $Z_1$ and $Z_2$ are methyl, or $Z_1$ and $Z_2$ together form a ring which may be additionally substituted by an ester, ether, amide, amino, carboxy or urethane group. The compounds of formula F1 are also called NOR compounds and are disclosed in WO-A-99/00450.

Polymeric dispersing or solvating agents having amphiphilic properties are polymeric dispersing or solvating agents which have polar and nonpolar groups in the same molecule and they are, for example, dispersing or solvating agents based on polyethylene glycols (PEG), polyacrylates, polysiloxanes, polyvinyl acetate or block copolymers containing at least one block copolymer based on acrylate, acrylic acid or methacrylate.

The novel polymeric dispersing or solvating agents having amphiphilic properties have at least two different polarities within one polymer molecule. Oligomeric structures are also possible. They are usually copolymers, for example random copolymers, or block copolymers which can be prepared by known polymerisation reactions, for example by radical or anionic polymerisation, by polycondensation reactions, such as by reaction of end-functionalised oligomeric or comb polymers, which polymers may be prepared e.g. by graft reaction. Block copolymers are, for example, diblock copolymers (A—B type) or triblock copolymers (A—B—A or A—B—C type) and so-called tapered structures.

Diblock copolymers (A—B type) are, for example, poly(styrene-b-methylmethacrylate), poly(styrene-b-tert-butylmethacrylate), poly(styrene-b-methylacrylate), poly(styrene-b-n-butylacrylate), poly(styrene-b-tert-butylacrylate), poly(styrene-b-butadiene), poly(styrene-b-isoprene[1,4-addition]), tapered block copolymer poly(styrene-b-butadiene), tapered block copolymer poly(styrene-b-ethylene), poly(styrene-b-2-vinylpyridine), poly(styrene-b-4-vinylpyridine), poly(styrene-bis-tert-butylstyrene), poly(styrene-b-dimethylsiloxane), poly(butadiene-bdimethylsiloxane), poly(butadiene[1,4-addition]-b-methylmethacrylate), poly(isoprene[1-4-addition]-b-methylmethacrylate), poly(butadiene-b-tert-butylmethacrylate), poly(butadiene-b-tert-butylacrylate), poly(isoprene-b-2-vinylpyridine), poly(butadiene-b-4-vinylpyridine), poly(styrene-b-methylmethacrylate), poly(methylmethacrylate-b-tert-butylmethacrylate), poly(methylmethacrylate-b-tert-butylacrylate), poly(tert-butylacrylate-b-methylmethacrylate), poly(n-butylacrylate-b-methylmethacrylate), poly(2-vinylpyridine-b-methylmethacrylate), poly(tert-butylmethacrylate-b-tert-butylacrylate), poly(tert-butylmethacrylate-b-2-vinylpyridine), poly(tert-butylmethacrylate-b-4-vinylpyridine), poly(tert-butylacrylate-b-2-vinylpyridine), poly(2-vinylpyridine-b-4-vinylpyridine), poly(ethylene-b-methylmethacrylate), poly(ethylene-b-2-vinylpyridine) or poly(ethylene-b-4-vinylpyridine).

Triblock copolymers of the A—B—A type are, for example, poly(methylmethacrylate-b-styrene-b-methylmethacrylate), poly(tert-butylmethacrylate-b-styrene-b-tert-butylmethacrylate), poly(tert-butylacrylate-b-styrene-b-tert-butylacrylate), poly(2-vinylpyridine-b-styrene-b-tert-butylacrylate), poly(4-vinylpyridine-b-styrene-b-4-vinylpyridine), poly(butadiene[1,2-addition]-b-styrene-b-butadiene[1,2-addition]), poly(butadiene[1,4-addition]-b-styrene-b-butadiene[1,4-addition]), poly(styrene-b-butadiene[1,4- and 1,2-addition]-b-styrene), poly(methylmethacrylate-b-butadiene[1,4- or 1,2-addition]-b-methylmethacrylate), poly(tert-butyl-methacrylate-b-methylmethacrylate-b-tert-butylmethacrylate), poly(tert-butylacrylate-b-methylmethacrylate-b-tertbutylacrylate), poly(methylmethacrylate-b-2-vinylpyridine-b-methylmethacrylate), poly(4-vinylpyridine-b-methylmethacrylate-b-4-vinylpyridine), poly(methylmethacrylate-b-tert-butylacrylate-b-methylmethacrylate), poly(methylmethacrylate-b-n-butylacrylate-b-methylmethacrylate), poly(tert-butylmethacrylate-b-tert-butylacrylate-b-tert-butylmethacrylate), poly(2-vinylpyridine-b-tert-butylacrylate-b-2-vinylpyridine), poly(4-vinylpyridine-b-tert-butylacrylate-b-4-vinylpyridine), poly(styrene-b-n-butylacrylate-b-styrene), poly(styrene-b-ethylacrylate-b-styrene), poly(styrene-b-ethylene-b-styrene), poly(styrene-b-butylene-b-styrene), poly(ethylene oxide-b-styrene-b-ethylene oxide), poly(styrene-b-ethylene oxide-b-styrene) or poly(styrene-b-acrylic acid-b-styrene).

Triblock copolymers of the A—B—C type are, for example, poly(styrene-b-butadiene-b-2-vinylpyridine), poly(styrene-b-butadiene-b-4-vinylpyridine), poly(styrene-b-tert-butylmethacrylate-b-2-vinylpyridine), poly(styrene-b-tert-butyimethacrylate-b-4-vinylpyridine), poly(styrene-b-2-vinylpyridine-b-4-vinylpyridine), poly(butadiene-b-styrene-b-methylmethacrylate), poly(styrene-b-butadiene-b-methylmethacrylate), poly(styrene-b-2-vinylpyridine-b-ethyl oxide), poly(styrene-b-tert-butylacrylate-b-methylmethacrylate), poly(styrene acid-b-methylmethacrylate), poly(styrene-b-a-methylstyrene-b-methylmethacrylate) or poly(styrene-b-amethylstyrene-b-tert-butylacrylate).

Long-chain block copolymers of particular interest have a chain length of more than 10 carbon atoms, preferably of $C_{12}$–$C_{18}$ carbon atoms.

Particularly suitable dispersing or solvating agents having amphiphilic properties are, for example, poly(butadienemethylmethacrylate), poly(isoprenemethylmethacrylate), poly(ethylenemethylmethacrylate), poly(styrene-4-vinylpyridine), poly(styrene-2-vinylpyridine), poly(styrene-n-butylacrylate), poly(styrene-tert-butylacrylate), poly(styrene sodium acrylate), poly(styrene-acrylic acid), poly(methylmethacrylate sodium acrylate), poly(methylmethacrylate sodium methacrylate), poly(ethylene oxide-ε-caprolactone), poly(2-vinylpyridine ethylene oxide), poly(butadiene-ethylene oxide), poly(butadiene sodium acrylate), poly(ethylene-ethylene oxide), poly(ethylene-propylene oxide), poly(styrene-ethylacrylate-styrene), poly(ethylene oxide-styrene'-ethylene oxide), poly(styrene-acrylic acid-styrene), poly(styrenebutadienemethyimethacrylate), poly(styrene-vinylpyridine-ethylene oxide), poly(styrene-4-vinylbenzoic acid), poly(styrene-polyglycidyl-methacrylate), poly(ethylene-glycidyl methacrylate), poly(propylene acrylic acid), poly(ethylene acrylic acid), poly(propylenemaleic anhydride), poly(ethylenemaleic anhydride), poly (styrenemaleic anhydride), polymethacrylic acid-polyalkylene; oxide block copolymers for example according to EP-A-0 859 028, polysiloxanepolyoxyalkylene, copolymers of maleates and styrene or styrene derivatives, for example according to EP-A-0 791 024, polystyrene-polysiloxane block copolymers, polyacrylatepolysiloxane block copolymers and cyclosiloxane-radiale copolymers, prepared e.g. using ATRP technology according to EP-A-0 870 774, methylacrylate-styrene copolymer, methylmethacrylate-styrene; polybutadiene-methylacrylates, prepared by nitroxyl-initiated radical polymerisation according to EP-A-0 135 280.

The polyalkylene oxides are preferably polyethylene oxide, polypropylene oxide and polybutylene oxide.

Suitable block copolymers are, for example, polyacrylate/polystyrene, polymethacrylatelpolyethylene oxide, polyacrylate/polyethylene oxide, polyacrylatelpolyethylene, polyvinyl acetate/polyethylene, polystyrene/polybutadiene, polyacrylate/polybutadiene, polyacrylate/polyisoprene, polyisoprene/polymethylmethacrylate, polyethylene/polymethylmethacrylate, polyethylenelpolyethylene oxide or polyethylenelpolypropylene oxide.

Particularly suitable dispersing or solvating agents having amphiphilic properties are, for example, poly(styrene-bis-sodium acrylate), poly(styrene-bis-acrylic acid), poly(styrene-bis-sodium methacrylate), poly(styrene-bis-N-methyl-4-vinylpyridinium iodide), poly(isoprene-bis-N-methyl-2-vinylpyridinium iodide), poly(styrene-bis-ethylene oxide), poly(methylmethacryate-bis-sodium acrylate), poly(methylmethacrylate-bis-sodium methacrylate), poly(methylmethacrylate-bis-ethylene oxide), poly(tert-butylmethacrylate-bis-ethylene oxide), poly(methylmethacrylate-bis-N-methyl-4-vinylpyridinium iodide), poly(ethylene oxide-bis-lactate), poly(2-vinylpyridine-bis-ethylene oxide), poly(butadiene-bis-sodium acrylate), poly(butadiene-bis-sodium methacrylate), poly(butadiene-bis-N-methyl-4-vinylpyridinium iodide), poly(butadiene-bisethylene oxide), poly(ethylene-bis-ethylene oxide) or poly(ethylene-bis-propylene oxide).

Particularly preferred polysiloxanes containing long-chain side groups are disclosed, inter alia, in U.S. Pat. No. 5,387,467.

Other likewise preferred dispersing or solvating agents based on polyacrylates are described, inter alia, in U.S. Pat. No. 5,133,898.

Particularly preferred dispersing or solvating agents based on acrylate are, for example, Tegomer®DA 100, Tegome®DA 102 or Wax P 121®, of Th. Goldschmidt AG, Germany.

Particularly preferred are compositions wherein component (c) is a dispersing or solvating agent based on polyacrylates or polysiloxanes containing long-chain sidegroups.

The blend of components (b) and (c) is suitable for stabilising synthetic polymers, in particular thermoplastic polymers, e.g. polyolefins and polystyrenes, against oxidative, thermal or light-induced degradation.

Examples of synthetic polymers are:
1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic. Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of mono6lefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/arylic acid copolymers and their salts (ionomners) as well as terpolymers of ethylene with propylene, and a diene such as hexadiene, dicyclopentadiene or ethylidenenorbornene; and mixtures of such copolymers with one another and with polymers mentioned in 1)) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or α-methylstyrene with dienes or acrylic derivatives; for example styrene/butadiene, styrene/acrylonitrile, styrene/alkyl methacrylate, styrene/butadiene/alkyl acrylate, styrene/butadiene/alkyl methacrylate, styrehe/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrenelisoprene/styrene, styrene/ethylene/butylene/styrene or styrene/ethylene/propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylatelbutadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyahates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as-well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamine's on the other hand, such as phenol/formaldehyde resins urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products, of diglycidyl ethers of bisphenol A and bisphenol F, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PANHDPE, PA/PP, PA/PPO, PBT/PC/ABS or PBT/PET/PC.

A preferred group of synthetic polymers are halogen-containing polymers. These are preferably chlorine-containing polymers, for example polymers of vinyl chloride, vinyl resins containing vinyl chloride units in their structure, copolymers of vinyl chloride, and vinyl esters of aliphatic acids, in particular vinyl acetate, copolymers of vinyl chloride with esters of acrylic and methacrylic acid and with acrylonitrile, copolymers of vinyl chloride with diene compounds and unsaturated dicarboxylic acids or their anhydrides, copolymers of vinyl chloride with diethylmaleate, diethylfumarate or maleic anhydride, postchlorinated polymers and copolymers of vinyl chloride, copolymers of vinyl chloride and vinylidene chloride with unsaturated aldehydes, ketones and others, such as acrolein, crotonic aldehyde, vinyl methyl ketone, vinyl methyl ether, vinyl isobutyl ether and similar compounds; polymers of vinylidene chloride and copolymers thereof with vinyl chloride and other polymerisable compounds; polymers of vinyl chloroacetate and dichlorodivinyl ether; chlorinated polymers of vinyl acetate, chlorinated polymeric esters of acrylic acid and of alpha-substituted acrylic acid; polymers of chlorinated styrenes, for example dichlorostyrene; chlorinated rubbers; chlorinated polymers of ethylene; polymers and postchlorinated polymers of chlorobutadiene and their copolymers with vinyl chloride, rubber hydrochloride and chlorinated rubber hydrochloride; and blends of the cited polymers with each other or with other polymerisable compounds.

Also included are the graft polymers of PVC with EVA, ABS and MBS. Preferred substrates are also blends of the above-cited homo- and copolymers, in particular vinyl chloride homopolymers, with other thermoplastic or/and elastomeric polymers, in particular blends with ABS, MBS, NBR, SAN, EVA, CPE, MBAS, PMA, PMMA, EPDM and polylactones.

Other preferred polymers are suspension and bulk polymers, and emulsion polymers.

The chlorine-containing polymer is particularly preferably polyvinyl chloride, especially suspension polymers and bulk polymers.

The chlorine-containing polymers preferably do not contain any plasticiser.

It is preferred to use a stabilised halogen-containing polymer, as described above, containing at least one inorganic zinc compound, such as zinc oxide, zinc hydroxide, zinc chloride, zinc sulfide or superbasic zinc oxidyhydroxide addition compounds, or an organic zinc compound from the series of the aliphatic saturated $C_2$–$C_{22}$carboxylates, of the aliphatic unsaturated $C_3$–$C_{22}$carboxylates, of the aliphatic $C_2$–$C_{22}$carboxylates, which are substituted by at least one OH group or the chain of which is interrupted by at least one 0 atom (oxa acids), of the cyclic and bicycliccarboxylates containing 5–22 carbon atoms, of the phenylcarboxylates which are unsubstituted or substituted by at least one OH group and/or by $C_1$–$C_{16}$alkyl, of the naphthylcarboxylates which are unsubstituted or substituted by at least one OH group and/or by $C_1$–$C_{16}$alkyl, of the phenyl-$C_1$–$C_{16}$alkylcarboxylates, of the naphthyl-$C_1$–$C_{16}$alkylcarboxylates or of the phenolates which may be substituted by $C_1$–$C_{12}$alkyl.

Examples to be mentioned by name are the zinc salts of the monovalent carboxylic acids, such as acetic acid, propionic acid, butyric acid, valenc acid, hexanoic acid, oenanthic acid, octanoic acid, neodecanoic acid, 2-ethylhexanoic acid, pelargonic acid, decanoic acid, undecanoic acid, dodecanoic acid, tridecanoic acid, myristylic acid, paclmitic acid, isostearic acid, stearic acid, 12-hydroxystearic acid, 9,10-dihydroxystearic acid, 3,6-dioxaheptanoic acid, 3,6,9-trioxadecanoic acid, behenic acid, behzoic acid, p-tert-butylbenzoic acid, dimethylhydroxybenzoic acid, 3,5-di-tert-butyl-4-hydroxybenzoic acid, tolylic acid, dimethylbenzoic acid, ethylbenzoic acid, n-propylbenzoic acid, salicylic acid, p-tert-octylsalicylic acid and sorbic acid; the zinc salts of the monoesters of divalent carboxylic acids, such as oxalic acid, malonic acid, succinic acid, glutaric acid, adipic acid, fumaric acid, pentane-1,5-dicarboxylic acid, hexane-1,6-dicarboxylic acid, heptane-1,7-dicarboxylic acid, octane-1,8-dicarboxylic acid, 3,6,9-trioxadecane-1,10-dicarboxylic acid, polyglycol dicarboxylic acid (n=10–12), phthalic acid, isophthalic acid, terephthalic acid and hydroxyphthalic acid; and of the di- or triesters of tri-ortetravalent carboxylic acids, such as hemimellitic acid, trimellitic acid, pyromellitic acid, citric acid, and the zinc salts of the mono- and di-esterified phosphoric acid or of the monoesterified phosphorous acids, such as described in JP3,275,570.

Particularly preferred is an organic zinc carboxylate of a carboxylic acid containing 7 to 18 carbon atoms (zinc soaps), for example benzoates or alkanoates, preferably stearate, oleate, laurate, palmitate, behenate, hydroxystearates; dihydroxystearates or (iso)octanoate. Stearate, oleate, benzoate and 2-ethylhexanoate are very particularly preferred.

Other suitable compounds besides the cited zinc compounds are also inorganic or organic aluminium compounds to which the specifications given above for the zinc compounds also apply. Further details on the usable and preferred aluminium compounds are to be found in U.S. Pat. No. 4,060,512.

Other suitable compounds besides the cited zinc compounds are also inorganic or organic rare-earth compounds, to which the specifications given above for the zinc compounds apply. The term rare-earth compound is to be understood as meaning especially compounds of the elements cerium, praseodym, neodym, samarium, europium, gadolinium, terbium, dysprosium, holmium, erbium, thulium, ytterbium, lutetium, lanthanum and yttrium, mixtures with cerium being particularly preferred. Other preferred rare-earth compounds are to be found in EP-A-0 108 023.

Where appropriate, it is possible to use a mixture of zinc, aluminium, lanthanum or lanthanoid compounds of different structure. It is also possible for organic zinc, aluminium, lanthanum or lahtanoid compounds to be coated onto a hydrotalcite, zeolite or dawsonite; see also DE-A-4 031 818.

The PVC stabilised according to this invention may contain additional additives. These additional additives are, for example, inorganic or organic calcium or magnesium compounds, zeolites, hydrotalcites, dawsonites, magadiites, kenyaites, canemite, 1,3-diketo compounds, polyols, N-containing compounds, for example β-aminocrotonates, such as mentioned in EP-A-0 465 405, page 6, lines 9–14; α-phenylindole, pyrroles, sterically hindered amines (HALS), dihydropyridines and their polymers, perchlorates, epoxides, phenolic antioxidants, naphthenes, thiophosphates, plasticisers, fillers and reinforcing agents, such as calcium carbonate, magnesium oxide, magnesium hydroxide, silicates, glass fibres, talcum, kaolin, chalk, mica, metal oxides and metal hydroxides, carbon black or graphite; phosphites, sequestering agents, light stabilisers, UV absorbers, lubricants, impact modifiers and processing agents, fatty acid esters, paraffins, blowing agents, fluorescent whitening agents, gelling agents, colourants, pigments, smoke suppressants, antistatic agents, antifogging agents, biocides, thiodipropionic acids and their esters, dialkyldisulfides, mercaptocarboxylates, peroxide-scavenging compounds, modifiers and further complex formers for Lewis acids.

Preferred synthetic polymers are also polyolefins and polystyrenes, in particular polyethylene or polypropylene.

To be highlighted in particular is the effect of the blend of the components (b) and (c) against oxidative and thermal degradation of polyolefins which occurs when thermoplasts are processed and used. The inventive components (b) and (c) are therefore excellently suitable for use as long-term heat stabilisers.

Component (b) is preferably added to the synthetic polymer to be stabilised in an amount from 0.01 to 10%, for example from 0.01 to 5%, preferably from 0.025 to 3%, particularly preferably from 0.025 to 1%, based on the weight of the synthetic polymer to be stabilised.

Component (c) is usefully added to the synthetic polymer to be stabilised in an amount from 0.005 to 10%, preferably from 0.01 to 5%, for example from 0.02 to 1%, based on the weight of the synthetic polymer to be stabilised.

In addition to the component (b) and (c), the novel compositions can contain further costabilisers (additives), for example fillers and reinforcing agents, plasticisers, lubricants, emulsifiers, pigments, rheology additives, catalysts, flow control agents, fluorescent whitening agents, flame retardants or blowing agents.

Fillers and reinforcing agents are, for example, calcium carbonate, silicates, glass fibres, glass beads, talcum, kaolin, mica, barium sulfate, metal oxides and metal hydroxides, carbon black, graphite, wood flour, and flours or fibres of other natural products, or synthetic fibres.

Particularly interesting compositions are-those which comprise in addition to components (a), (b) and (c) as further additives fillers, in particular talcum, kaolin, mica or calcium carbonate.

The fillers and reinforcing agents, such as talcum, calcium carbonate or kaolin, are added to the polyolefins in concentrations of, for example, 0.01 to 40%, based on the total weight of the polyolefins to be stabilised.

Other interesting additional additives in the novel compositions are also alkaline earth metal salts of higher fatty acids, such as calcium stearate or alkaline earth metal salts of lactic acids, for example calcium lactylate or calcium stearoyl-2-lactylate.

The components (b) and (c) and further optional additives are incorporated into the synthetic polymer by known methods, for example before or during extrusion or moulding or also by applying the dissolved or dispersed stabiliser blend to the synthetic polymer, if required with subsequent evaporation of the solvent. The additive blend of the components (b) and (c) and further optional additives can also be added to the polymers to be stabilised in the form of a masterbatch containing them e.g. in a concentration of 2.5 to 25% by weight.

The additive blend of the components (b) and (c) and further optional additives can also be added before or during the polymerisation or before crosslinking.

The additive blend of the components (b) and (c) and further optional additives can be incorporated into the synthetic polymer to be stabilised in pure form or encapsulated in waxes, oils or polymers.

The additive blend of the components (b) and (c) and further optional additives can also be sprayed onto the synthetic polymer to be stabilised. This blend is capable of diluting other additives (e.g. the above-mentioned standard additives) or their melts so that it can also be sprayed onto the synthetic polymer to be stabilised together with those additives. The addition by spraying is particularly advantageous during the deactivation of the polymerisation catalysts, it being possible to use e.g. the steam used for deactivation for spraying.

In the case of spherical polymerised polyolefins it may for example be advantageous to apply the additive blend by spraying onto the components (b) and (c), optionally together with other additives.

The synthetic polymers thus stabilised can be used in a wide range of forms, for example as foils, fibres, filaments, moulding compositions, profiles or as binders for paint systems, in particular powder coating compositions, adhesives or putties.

The polyolefins stabilised in this manner can also be used in a wide range of forms, in particular as high-build polyolefin moulded articles which are in permanent contact with extracting media, for example tubes for liquids or gases, foils, fibres, geomembranes, filaments, profiles or tanks.

The preferred high-build polyolefin moulded articles have a coating thickness from 1 to 50 mm, preferably from 1 to 30 mm, e.g. from 2 to 10 mm.

A preferred embodiment of this invention is therefore the use of the component (c) for the improved dispersion, in particular for the dissolution or compatibility enhancement, of additives selected from the stabiliser, antistatic agent, nucleating agent, biocide and/or flame retardant group in synthetic polymers.

Another preferred embodiment of this invention is also the use of the additive blend of the components (b) and (c) for stabilising synthetic polymers against oxidative, thermal or light-induced degradation, with the proviso that component (b) contains at least one compound from the stabiliser group.

This invention also relates to an additive blend, which comprises ($\alpha$) at least one additive selected from the stabiliser, antistatic agent, nucleating agent, biocide and/or flame retardant group, and ($\beta$) at least one polymeric dispersing or solvating agent having amphiphilic properties.

Also preferred are additive blends wherein the weight ratio of components ($\alpha$):($\beta$) is from 100:0.01 to 0.01:100.

This invention also relates to a process for the improved dispersion of additives selected from the stabiliser, antistatic agent, nucleating agent, biocide and/or flame retardant group in synthetic polymers, which comprises incorporating therein, or applying thereto, at least one polymeric dispersing or solvating agent having amphiphilic properties.

This invention also relates to a process for stabilising synthetic polymers against oxidative, thermal or light-induced degradation, which comprises incorporating therein, or applying thereto, at least one component (b) and (c) each, with the proviso that component (b) contains at least one compound from the stabiliser group.

The components (b) and (c) preferably employed for the uses and processes disclosed above are the same as those described for the compositions containing a synthetic polymer.

The following Examples illustrate the invention in more detail. Parts or percentages are by weight.

EXAMPLE 1

Enhancing the effect of nucleating agents in polypropylene by means of polymeric dispersing or solvating agents having amphiphilic properties.

1.5 kg of polypropylene powder (Profax®6561, of Montell) are, mixed to homogeneity in a high-speed mixer with 0.10% of Irgafos®168 [tris(2,4-di-tert-butylphenyl) phosphite], 0.05% of Irganox®1010 [pentaerythritol-tetrakis-[3-(3,5-di-tert-butyl-4-hydroxyphenyl)propionate]; 0.10% of calcium stearate and with the additives listed in Table 1 (nucleating agents and dispersing or solvating agents), and this blend is then extruded in a twin-screw extruder, of Berstorff, at a temperature of at most 250° C. After drawing the extrudate through a water-bath to cool, it is granulated. 80×90 mm and 2 mm thick test panels are moulded from these granules by means of an injection moulding machine (Arburg 320 S) at a temperature of at most 250° C. E-modulus in megapascal (Mpa), haze in percent and clarity of these test panels are measured in accordance with the Euro-norm (EN) ISO 527-1. The higher the values for the E-modulus and the clarity, the better the dispersion of the additives in polypropylene and the higher the transparency of the polypropylene. The smaller the values for the haze, the better the dispersion of the additives in the polypropylene.

TABLE 1

| Examples | Additives | E-modulus (MPa) | Haze (%) | Clarity (%) |
|---|---|---|---|---|
| Example 1a[a)] | 0.10% Irgaclear ® DM[c)] | 1517 | 70.6 | 82.5 |
| Example 1b[a)] | 0.20% Wax P 121 ® [d)] | 1550 | 89.2 | 12.0 |
| Example 1c[a)] | 0.20% Tegomer ® DA 100[e)] | 1520 | 87.8 | 12.0 |
| Example 1d[b)] | 0.10% Irgaclear ® DM[c)] 0.20% Wax P 121 ® [d)] | 1552 | 57.5 | 89.4 |
| Example 1e[b)] | 0.10% Irgaclear ® DM[c)] 0.20% Tegomer ® DA 100[e)] | 1571 | 53.7 | 89.6 |

Footnotes [a)] to [e)] see end of Table 8 (Example 8).

EXAMPLE 2

Enhancing the long-term temperature stability of polypropylene by means of polymeric dispersing or solvating agents having amphiphilic properties.

1.5 kg of polypropylene powder (Profax®6501, of Montell) are mixed to homogeneity in a high-speed mixer with 0.10% of Irgafos®168 [tris(2,4-di-tert-butylphenyl) phosphite], 0.05% of Irganox®1010 [pentaerythritol-tetrakis-[3-(3,5-di-tert-butyl-4-hydroxyphenyl)propionate]; 0.10% of calcium stearate and with the additives listed in Table 2 (dispersing or solvating agents), and this blend is then extruded in a twin-screw extruder, of Berstorff, at a temperature of at most 250° C. After drawing the extrudate through a waterbath to cool, it is granulated. 80×90 mm and 2 mm thick test panels are then moulded from these granules by means of an injection moulding machine (Arburg 320 S) at a temperature of at most 250° C. One part of these panels is exposed to artificial ageing in a circulating air oven at 135° C. and the other at 150° C. The time until these panels become brittle is measured in days. The more time this takes, the more effective the additives. The results are compiled in Table 2.

TABLE 2

| | | Days until embrittlement | |
|---|---|---|---|
| Examples | Additives | at 135° C. | at 150° C. |
| Example 2a[a)] | — | 45 | 14 |
| Example 2b[b)] | 1.00% Wax P 121 ® [d)] | >70 | 31 |

TABLE 2-continued

| Examples | Additives | Days until embrittlement | |
|---|---|---|---|
| | | at 135° C. | at 150° C. |
| Example 2c[b)] | 1.00% Tegomer ® DA 100[e)] | >70 | 27 |
| Example 2d[b)] | 1.00% Tegomer ® DA 102[f)] | >70 | 31 |

Footnotes [a)], [b)], [d)] [e)] and [f)] see end of Table 8 (Example 8).

EXAMPLE 3

Effect of polymeric dispersing or solvating agents having amphiphilic properties on the long-term temperature stability of talcum-filled polypropylene.

1.5 kg of polypropylene powder (Profax®6501, of Montell) are mixed to homogeneity in a high-speed mixer with 0.10% of Irgafos®168 [tris(2,4-di-tert-butylphenyl) phosphite], 0.05% of Irganox®1010 [pentaerythritol-tetrakis-[3-(3,5-di-tert-butyl-4-hydroxyphenyl)propionate]; 20% of talcum and 0.10% of calcium stearate and with the additives listed in Table 3 (dispersing or solvating agents), and this blend is then extruded in a twin-screw extruder, of Berstorff, at a temperature of at most 250° C. After drawing the extrudate through a water-bath to cool, it is granulated. 80×90 mm and 2 mm thick test panels are then moulded from these granules by means of an injection moulding machine (Arburg 320 S)- at a temperature of at most. 250° C. One part of these panels is exposed to artificial ageing in a circulating air oven at 135° C. and the other at 150° C. The time until these panels become brittle is measured in days. The more time it takes, the more effective the additives. The results are compiled in Table 3.

TABLE 3

| Examples | Additives | Days until embrittlement | |
|---|---|---|---|
| | | at 135° C. | at 150° C. |
| Example 3a[a)] | — | 7 | 2 |
| Example 3b[b)] | 3.0% Wax P 121 ® [d)] | 52 | 20 |
| Example 3c[b)] | 3.0% Tegomer ® DA 102[f)] | 59 | 26 |

Footnotes [a)], [b)], [d)] and [f)] see end of Table 8 (Example 8).

EXAMPLE 4

Effect of polymeric dispersing or solvating agents having amphiphilic properties on the long-term temperature stability of polypropylene.

1.5 kg of polypropylene powder (PP Polychim®B10 FB, of Polychimie, France) are mixed to homogeneity in a high-speed mixer with 0.10% Irganox®HP 225 (Ciba Spezialitätenchemie AG, consisting of 42.5% of Irgafos®168 [tris(2,4-di-tert-butylphenyl)phosphite], 42.5% of Irganox®1010 [pentaerythritol-tetrakis-[3-(3,5-di-tert-butyl-4-hydroxyphenyl)propionate] and 15% of HP-1360® [mixture of about 85 parts by weight of 3-(3,4-dimethylphenyl)-5,7-di-tert-butylbenzofuran-2-one and about 15 parts by weight of 3-(2,3-dimethylphenyl)-5,7-di-tert-butylbenzofuran-2-one, structural formulae see footnote g) at the end of Table 8]) and 0.05% of DHT 4A® (Kyowa Chemical Industry Co., Ltd. [$Mg_{4.5}Al_2(OH)_{13}CO_3.3.5\ H_2O$]) and with the additives listed in Table 4 (dispersing or solvating agents), and this blend is then extruded in a twin-screw extruder, of Berstorff, at a temperature of at most 250° C. After drawing the extrudate through a waterbath to cool, it is granulated. 80×90 mm and 2 mm thick test panels are then moulded from these granules by means of an injection moulding machine (Arburg 320 S) at a temperature of at most 220° C. The test panels are stored in a conditioned room for 30 days at 50° C. and at 95% relative humidity. The Yellowness Index (YI) of these test panels is determined in accordance with ASTM D 1925-70. Low YI values signify little discoloration, high YI values strong discoloration of the samples. The less discoloration, the more effective the stabiliser or stabiliser blend. The results are compiled in Table 4.

TABLE 4

| | | Yellowness Index | |
|---|---|---|---|
| Examples | Additives | before storage | after storage (30 days/50° C.) |
| Example 4a[a)] | — | 3.01 | 4.48 |
| Example 4b[b)] | 0.02% Tegomer ® DA 102[f)] | 0.42 | 1.89 |
| Example 4c[b)] | 0.01% Tegomer ® DA 102[f)] 0.01% Iranox ® 1310[h)] | 0.29 | 1.90 |

Footnotes [a)], [b)], [f)] and [h)] see end of Table 8 (Example 8).

EXAMPLE 5

Effect of polymeric dispersing or solvating agents having amphiphilic properties on the long-term temperature stability of polypropylene.

The results compiled in Table 5 are obtained in analogy to Example 4 by replacing 0.05% of DHT 4A® (Kyowa Chemical Industry Co., Ltd. [$Mg_{4.5}Al_2(OH)_{13}CO_3.3.5\ H_2O$]) with 0.10% of calcium stearate.

TABLE 5

| | | Yellowness Index | |
|---|---|---|---|
| Examples | Additives | before storage | after storage (30 days/50° C.) |
| Example 5a[a)] | — | −0.14 | 3.62 |
| example 5b[b)] | 0.05% Tegomer ® DA 102[f)] | 0.07 | 1.72 |

Footnotes [a)], [b)] and [f)] see end of Table 8 (Example 8).

EXAMPLE 6

Effect of polymeric dispersing or solvating agents having amphiphilic properties on the gloss of polypropylene filled with talcum and carbon black.

1.5 kg of polypropylene powder (Daplen® KS 10, of Borealis, Linz, Austria, containing, 20% of talcum and 1% of carbon black) are mixed to homogeneity in a high-speed mixer with 0.10% of trgafos®168 [tris(2,4-di-tert-butylphenyl)phosphite], 0.05% of Irganox®1010 [pentaerythritol-tetrakis-[3-(3,5-di-tert-butyl-4-hydroxyphenyl)propionate]; 0.20% of Chimassorb®2020 [Ciba Speziealitätenchemie AG, structural formula see footnote i) at the end of Table 8] and with the additives listed in Table 6 (dispersing or solvating agents), and this blend is then extruded in a twin-screw extruder, of Berstorff, at a temperature of at most 250° C. After drawing the extrudate through a waterbath to cool, it is granulated. 40×60 mm and 2 mm thick test panels are then moulded from these granules by means of an injection moulding machine (Arburg 320 S) at a temperature of at most 250° C. The panels are exposed to artificial weathering in an Atlas Weather-O-meter Ci 65A at a black panel temperature of 63° C. without spraying with water. After 100 hours each, samples are taken for surface measurements. The gloss of the samples is determined in accordance with DIN 67530. The higher the values in percent, the more effective the additives. The results are compiled in Table 6.

TABLE 6

| Examples | Additives | Gloss after x hours artificial weathering in % | | |
|---|---|---|---|---|
| | | 0 h | 1000 h | 2000 h |
| Example 6a[a)] | — | 49 | 45 | 35 |
| Example 6b[b)] | 0.10% Tegomer ® DA 102[f)] | 56 | 51 | 49 |

Footnotes [a)], [b)] and [f)] see end of Table 8 (Example 8).

EXAMPLE 7

Enhancing the long-term temperature stability of polypropylene filled with talcum and carbon black by means of polymeric dispersing or solvating agents having amphiphilic properties.

1.5 kg of polypropylene powder (Daplen® KS 10, of Borealis, Linz, Austria, containing 20% of talcum and 1% of carbon black) are mixed to homogeneity in a high-speed mixer with 0.10% of Irgafos®168 [tris(2,4-di-tert-butylphenyl)phosphite], 0.05% of Irganox®1010 [pentaerythritol-tetrakis-[3-(3,5-di-tert-butyl-4-hydroxypheny)propionate]; 0.10% of Irganox®PS 802 [thiodipropionic acid-di-stearyl ester], 0.20% of Chimassorb®2020 [Ciba Spezialitätenchemie AG, structural formula see footnote i) at the end of Table 8] and with the additives listed in Table 7 (dispersing or solvating agents), and this blend is then extruded in a twin-screw extruder, of Berstorff, at a temperature of at most 250° C. After drawing the extrudate through a waterbath to cool, it is granulated. 80×90 mm and 2 mm thick test panels are then moulded from these granules by means of an injection moulding machine (Arburg 320 S) at a temperature of at most 250° C.

These panels are exposed to artificial ageing in a circulating air oven at 150° C. The time until the panels become brittle is measured in days. The more time this takes, the more effective the additives. The results are listed in Table 7.

TABLE 7

| Examples | Additives | Days until embrittlement at 150° C. |
|---|---|---|
| Example 7a[a)] | — | 24 |
| Example 7b[b)] | 0.10% Tegomer ® DA 102[f)] | 32 |

Footnotes [a)], [b)] and [f)] see end of Table 8 (Example 8).

EXAMPLE 8

Effect of polymeric dispersing or solvating agents having amphiphilic properties on the gloss of low-density linear polyethylene (LLDPE).

1.5 kg of LLDPE (LE 8001®, of Borealis, Linz, Austria) are mixed to homogeneity with 0.05% of Irgafos®168 [tris(2,4-di-tert-butylphenyl)phosphite], 0.05% of Irganox®1010 (pentaerythritol-tetrakis-[3-(3,5-di-tert-butyl-4-hydroxyphenyl)propionate]; and with the additives listed in Table 8 (dispersing or solvating agents), and this blend is then extruded in a single-screw extruder, of Collin (Germany), at a temperature of at most 230° C. After drawing the extrudate through a waterbath to cool, it is granulated. 40×60 mm and 2 mm thick test panels are then moulded from these granules by means of an injection moulding machine (Arburg 320 S) at a temperature of at most 230° C. These panels are exposed to artificial weathering in an Atlas Weather-O-meter Ci 65A at a black panel temperature of 100° C. without spraying with water. The gloss of the samples is determined after 38 days in accordance with DIN 67530. The higher the values in percent, the more effective the additives. The results are compiled in Table 8.

TABLE 8

| Examples | Additives | Gloss after 38 days of artificial weathering in % |
|---|---|---|
| Example 8a[a)] | — | 20 |
| Example 8b[b)] | 0.05% Tegomer ® DA 102[f)] | 58 |

[a)]Comparison Example.
[b)]Example of this invention.
[c)]Irgaclear ® DM (Ciba Spezialitätenchemie AG) is a nucleating agent and denotes (1.3:2.4)-diparamethyldibenzylidene sorbitol of formula Ia

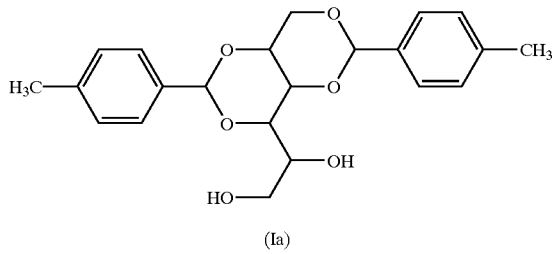

(Ia)

[d)]Wax P 121 ® (of Th. Goldschmidt AG, Germany) is a dispersant wax containing Tegomer ® DA 100[e)].
[e)]Tegomer ® DA 100 (of Th. Goldschmidt AG, Germany) is an acrylate-based polymeric dispersing or solvating agent.
[f)]Tegomer ® DA 102 (of Th. Goldschmidt AG, Germany) is an acrylate-based polymeric dispersing or solvating agent.
[g)]HP 136 ® (Ciba Spezialitätenchemie AG) is a mixture of about 85 parts by weight of the compound of formula Va and about 15 parts by weight of the compound of formula Vb.

TABLE 8-continued

| Examples | Additives | Gloss after 38 days of artificial weathering in % |
|---|---|---|

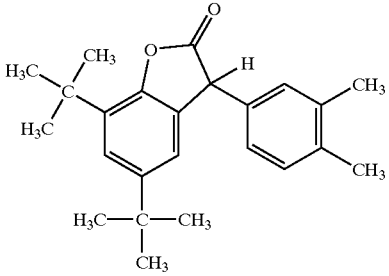

(Va)　　　　　(Vb)

h)Irganox® 1310 (Ciba Spezialitätenchemie AG) is a compound of formula AO-1

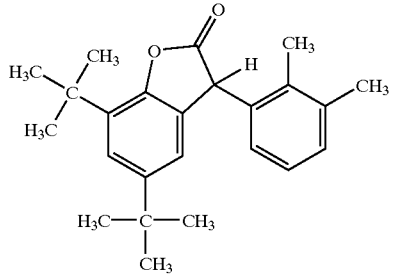

(AO-1)

i)Chimasssorb® 2020 (Ciba Spezialitätenchemie AG) is a compound of formula H1

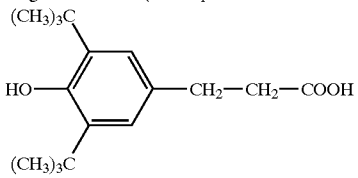

(H1)

wherein n' is a number from 2 to 14.

What is claimed is:

1. A composition, which comprises
   a) a synthetic polymer subject to oxidative, thermal or light-induced degradation,
   b) at least one additive selected from the stabiliser, antistatic agent, nucleating agent, biocide and/or flame retardant group, and
   c) at least one polymeric dispersing or solvating agent based on polyacrylates, polysiloxanes, polyvinyl acetate or on block copolymers containing at least one block based on acrylate, acrylic acid or methacrylate having amphiphilic properties.

2. A composition according to claim 1, wherein component (a) is a polyolefin or polystyrene.

3. A composition according to claim 1, wherein component (a) is polyethylene or polypropylene.

4. A composition according to claim 1, wherein component (b) IS a stabiliser and/or nucleating agent.

5. A composition according to claim 4, wherein the stabiliser is a phenolic antioxidant, aminic antioxidant, UV absorber, light stabiliser, metal deactivator, phosphite, phosphonite, hydroxylamine, nitrone, thiosynergist, peroxide-scavenging compound, a compound of the benzofuran-2-one type and/or a PVC heat stabiliser.

6. A composition according to claim 4, wherein the nucleating agent is a compound of formula I

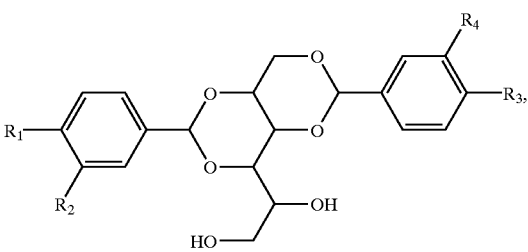

(I)

wherein $R_1$, $R_2$, $R_3$ and $R_4$ are each independently of one another hydrogen or $C_1$–$C_4$alkyl.

7. A composition according to claim 1, wherein component (c) is a dispearsing or solvating agent based on polyacrylates or polysiloxanes containing long-chain side-groups.

8. A composition according to claim 1, wherein component (b) is present in an amount from 0.01 to 10%, based on the weight of component (a).

9. A composition-according to claim 1, wherein component (c) is present in an amount from 0.01 to 10%, based on the weight of component (a).

10. A composition according to claim 1, wherein additional additives are present besides the components (a), (b) and (c).

11. A composition according to claim 10, wherein the additional additives are fillers.

12. A composition according to claim 11, wherein the filler is talcum, kaolin, mica or calcium carbonate.

13. An additive blend, which comprises
   α) at least one additive selected from the stabiliser, antistatic agent, nucleating agent, biocide and/or flame retardant group, and
   β) at least one polymeric dispersing or solvating agent having amphiphilic properties.

14. An additive blend according to claim 13, wherein the weight ratio of the components (α):(β) is from 100:0.01 to 0.01:100.

15. A process for improving the dispersion of additives selected from the stabiliser, antistatic agent, nucleating agent, biocide and/or flame retardant group in synthetic polymers, which process comprises incorporating therein, or applying thereto, an effective dispersing amount of at least one component (c) as defined in claim 1.

16. A process for stabilising synthetic polymers against oxidative, thermal or light-induced degradation, which comprises incorporating therein, or applying thereto, an effective stabilizing amount of at least one component (b) and an effective dispersing amount of at least one component (c), each as defined in claim 1, with the proviso that component (b) contains at least one compound from the stabiliser group.

* * * * *